United States Patent
Perret et al.

(10) Patent No.: US 10,336,008 B2
(45) Date of Patent: Jul. 2, 2019

(54) METHOD FOR AUTOMATIC CALIBRATION OF A DEVICE FOR GENERATIVE PRODUCTION OF A THREE-DIMENSIONAL OBJECT

(71) Applicant: EOS GmbH Electro Optical Systems, Krailling (DE)

(72) Inventors: Hans Perret, München (DE); Jochen Philippi, Grafelfing (DE)

(73) Assignee: EOS GMBH ELECTRO OPTICAL SYSTEMS, Krailling (DE)

(*) Notice: Subject to any disclaimer, the term of this patent is extended or adjusted under 35 U.S.C. 154(b) by 91 days.

(21) Appl. No.: 14/888,969

(22) PCT Filed: May 8, 2014

(86) PCT No.: PCT/EP2014/059502
§ 371 (c)(1),
(2) Date: Nov. 4, 2015

(87) PCT Pub. No.: WO2014/180971
PCT Pub. Date: Nov. 13, 2014

(65) Prior Publication Data
US 2016/0082668 A1 Mar. 24, 2016

(30) Foreign Application Priority Data
May 10, 2013 (DE) .......... 10 2013 208 651

(51) Int. Cl.
*B29C 64/393* (2017.01)
*B29C 67/00* (2017.01)
(Continued)

(52) U.S. Cl.
CPC ........ *B29C 67/0088* (2013.01); *B22F 3/1055* (2013.01); *B29C 64/153* (2017.08);
(Continued)

(58) Field of Classification Search
CPC . B29C 67/0088; B29C 64/393; B29C 64/386; B29C 64/30; B29C 64/10; B29C 44/605; B29C 44/60; B22F 3/1055
See application file for complete search history.

(56) References Cited

U.S. PATENT DOCUMENTS 5,133,987 A 7/1992 Spence et al.
5,536,467 A 7/1996 Reichle et al.
(Continued)

FOREIGN PATENT DOCUMENTS

CN 1347783 A 5/2002
CN 101060990 A 10/2007
(Continued)

OTHER PUBLICATIONS

Fang, T. (2000). Online image processing and defect detection in layered manufacturing using process signature (Order No. 9973286). Available from ProQuest Dissertations & Theses Global. (304640382). Retrieved from https://search.proquest.com/docview/304640382?accountid=14753 (Year: 2000).*

(Continued)

*Primary Examiner* — Robert C Dye
*Assistant Examiner* — Nicholas R Krasnow
(74) *Attorney, Agent, or Firm* — Seyfarth Shaw LLP

(57) ABSTRACT

A method for automatically calibrating a device for generatively producing a three-dimensional object (8) comprises the following steps: irradiating an applied layer of a material (3) or a target by means of a first scanner (14) in order to produce a first test pattern (33) in the material (3) or the target; irradiating the applied layer of the material (3) or the target by means of a second scanner (15) in order to produce a second test pattern (34) in the material (3) or the target; detecting the first and second test patterns (33, 34) by means of a camera (24) and assigning the first and second test (Continued)

patterns (33, 34) to the first and second scanners (14, 15), respectively; comparing the first and/or the second test pattern (33, 34) with a reference pattern and/or comparing the first and second test patterns (33, 34) with one another; determining a first deviation of the first test pattern (33) from the reference pattern and/or a second deviation of the second test pattern (34) from the reference pattern and/or a relative deviation between the first test pattern (33) and the second test pattern (34); and calibrating the first and/or the second scanner (14, 15) in such a way that the first and/or the second deviation from the reference pattern and/or the relative deviation between the first test pattern (33) and the second test pattern (34) falls below a setpoint value.

11 Claims, 2 Drawing Sheets

(51) Int. Cl.

| | | |
|---|---|---|
| *G05B 19/401* | (2006.01) | |
| *B22F 3/105* | (2006.01) | |
| *B29C 64/153* | (2017.01) | |
| *B29C 64/386* | (2017.01) | |
| *B29C 64/277* | (2017.01) | |
| *B33Y 10/00* | (2015.01) | |
| *B33Y 30/00* | (2015.01) | |
| *B33Y 50/02* | (2015.01) | |
| *B29K 105/00* | (2006.01) | |

(52) U.S. Cl.
CPC .......... *B29C 64/277* (2017.08); *B29C 64/386* (2017.08); *B29C 64/393* (2017.08); *G05B 19/4015* (2013.01); *B22F 2003/1057* (2013.01); *B29K 2105/251* (2013.01); *B33Y 10/00* (2014.12); *B33Y 30/00* (2014.12); *B33Y 50/02* (2014.12); *G05B 2219/37558* (2013.01); *Y02P 10/295* (2015.11)

(56) References Cited

U.S. PATENT DOCUMENTS

| | | | |
|---|---|---|---|
| 5,832,415 | A | 11/1998 | Wilkening et al. |
| 6,483,596 | B1 | 11/2002 | Philippi et al. |
| 2002/0041818 | A1 | 4/2002 | Satoshi |
| 2004/0200816 | A1 | 10/2004 | Chung et al. |
| 2005/0263932 | A1 | 12/2005 | Heugel |
| 2007/0247514 | A1* | 10/2007 | Waidman ............. B23K 26/705 347/236 |
| 2010/0125356 | A1* | 5/2010 | Shkolnik ................... G06T 1/00 700/98 |
| 2010/0264302 | A1 | 10/2010 | Philippi |
| 2013/0187943 | A1* | 7/2013 | Bohn ................. H04N 13/0425 345/619 |
| 2013/0343947 | A1 | 12/2013 | Satzger et al. |

FOREIGN PATENT DOCUMENTS

| | | | |
|---|---|---|---|
| DE | 4302418 | A1 | 11/1994 |
| DE | 19918613 | A1 | 11/2000 |
| DE | 19953000 | C2 | 5/2001 |
| DE | 10235427 | A1 | 2/2004 |
| DE | 102004017769 | A1 | 12/2004 |
| DE | 102009016585 | A1 | 10/2010 |
| DE | 102009036153 | A1 | 2/2011 |
| DE | 102011009624 | A1 | 8/2012 |
| EP | 0792481 | B1 | 3/1998 |
| EP | 1048441 | A1 | 12/2000 |
| EP | 2186625 | A2 | 5/2010 |
| JP | 3-218816 | A | 9/1991 |
| WO | 2006034012 | A2 | 3/2006 |

OTHER PUBLICATIONS

International PCT Preliminary Report on Patentability and Written Opinoin, dated Nov. 10, 2015; with English Translation; 19 pages.
State Intellectual Property Office of the People's Republic of China, First Office Action, dated Oct. 26, 2016; with English Translation; 15 pages.

* cited by examiner

METHOD FOR AUTOMATIC CALIBRATION OF A DEVICE FOR GENERATIVE PRODUCTION OF A THREE-DIMENSIONAL OBJECT

The present invention relates to a method for automatically calibrating a device for generatively producing a three-dimensional object, and to such a device which carries out the method.

DE 43 02 418 A1 discloses a device for generatively producing an object, said device comprising an irradiation device having a plurality of scanners. The known device uses a plurality of scanners in order to reduce the expenditure of time for the production of the object by exposing a layer at a plurality of locations simultaneously.

Furthermore, it is known to use two scanners within a device, which cover two mutually adjacent scan zones of an enlarged construction zone in order to be able to produce larger objects. This last is difficult with only one scanner since the size of the construction zone of the device cannot be of arbitrary magnitude.

A method for calibrating a device for producing a three-dimensional object is known from DE 199 18 613 A1, but this method is designed only for one scanner. Furthermore, the method is to be carried out before the actual construction process.

The problem addressed by the present invention is that of providing a method for automatically calibrating a device for generatively producing a three-dimensional object and also such a device in such a way that the device can produce even large objects dimensionally accurately and rapidly.

Said problem is solved by means of a method for automatically calibrating a device for generatively producing a three-dimensional object and by means of, for example, a device for producing a three-dimensional object.

The method and the device have the advantage, in particular, that an automatic overlap correction of at least two scan zones which are assigned to at least two regions in the construction zone is made possible in the operating state of the device or during the construction process.

Further features and expediencies of the invention will become apparent from the description of exemplary embodiments with reference to the accompanying drawings. In the figures:

FIG. 1 shows a schematic view of a device for producing a three-dimensional object to which the present invention is applicable. In the exemplary embodiment illustrated, the device is a laser sintering machine.

Figure 1:
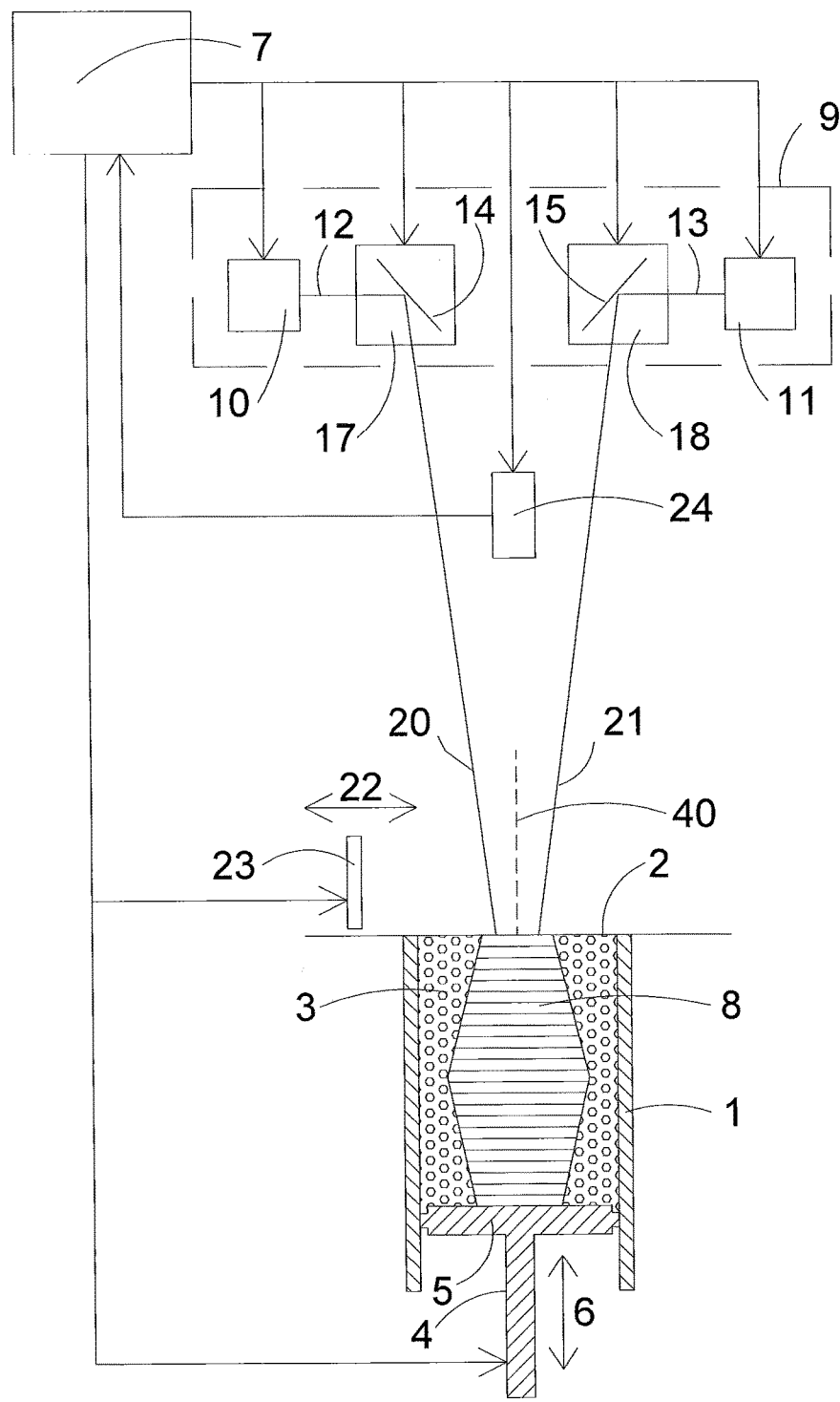
FIG. 1 shows a schematic view of a device for producing a three-dimensional object to which the present invention is applicable.

The device has a container 1, which is open on the top side and which defines a construction zone 2 within its upper edge. The container 1 can be embodied as an interchangeable container. A carrier 5 is situated in the container 1, which carrier is carried by a column 4 and is vertically movable by means of a height adjusting device 6 indicated schematically.

Above the construction zone 2, a coater 23 is horizontally movable by means of a moving device 22 indicated schematically, which coater, in a known manner, applies a layer of a pulverulent material 3 with a defined height to the construction zone 2 or to a previously at least selectively consolidated layer of the material 3 above the construction zone 2.

An irradiation device 9 for consolidating the topmost layer adjoining the construction zone 2 has at least one first and one second radiation source 10, 11, which in each case generate a focused or directional beam 12, 13 via an optical unit (not illustrated). The radiation sources 10, 11 are preferably light sources such as lasers, for example.

At least one first and one second scanner 14, 15 are arranged in the region above the container 1 or the construction zone 2. In the exemplary embodiment illustrated, the scanners 14, 15 are in each case embodied as mirrors which are cardanically suspended independently of one another and can be pivoted by means of corresponding control devices 17, 18. In this case, the beam 12 impinging on the first scanner 14 is reflected and is directed as beam 20 onto a first scan zone 30, illustrated in FIG. 2, in the construction zone 2, and the beam 13 impinging on the second scanner 15 is reflected and is directed as beam 21 onto a second scan zone 31, illustrated in FIG. 2, in the construction zone 2.

The reference sign 24 in FIG. 1 denotes a calibrated camera such as, for example, a CCD camera or a video camera, which can detect the construction zone 2. If the brightness of the surroundings is too low for detecting an image of the construction zone 2, provision can also be made of lighting devices (not illustrated) for brightening the construction zone.

The device including the control devices 17, 18 is controlled by means of a controller 7.

In order to produce the first layer of pulverulent material 3, the controller 7 controls the height adjusting device 6 in such a way that the surface of the carrier 5 is positioned at a predetermined height corresponding to the thickness of the layer below the coater 23. The first layer of the pulverulent material 3 is then applied by means of the coater 23 in the construction zone 2.

Afterward, the controller 7 controls the lighting device 9 and the control devices 17, 18 in such a way that the beam 20, 21 reflected by each corresponding scanner 14, 15 impinges on predetermined points of the construction zone 2 and consolidates them.

After the production of the first layer, the height adjusting device 6 is lowered by the controller 7 by the absolute value of the envisaged thickness of the second layer, and the coater 23 applies a new powder layer in the construction zone 2 in order to consolidate it in a similar manner. This process is repeated until the object 8 to be produced is completed.

The two scanners 14, 15 can advantageously irradiate a relatively large construction zone 2 overall, such that even particularly large objects 8 can be produced. It is also possible for the scan zones 30, 31 of the different scanners 14, 15 to overlap in an overlap region 37, shown in FIG. 2, in the construction zone 2. Consequently, a plurality of regions of the construction zone 2 can be consolidated simultaneously on account of the simultaneous irradiation by means of the beams 20, 21, such that the topmost layer of the object 8 is produced in a shortened time despite a constant reaction time of the material 3.

Figure 2:
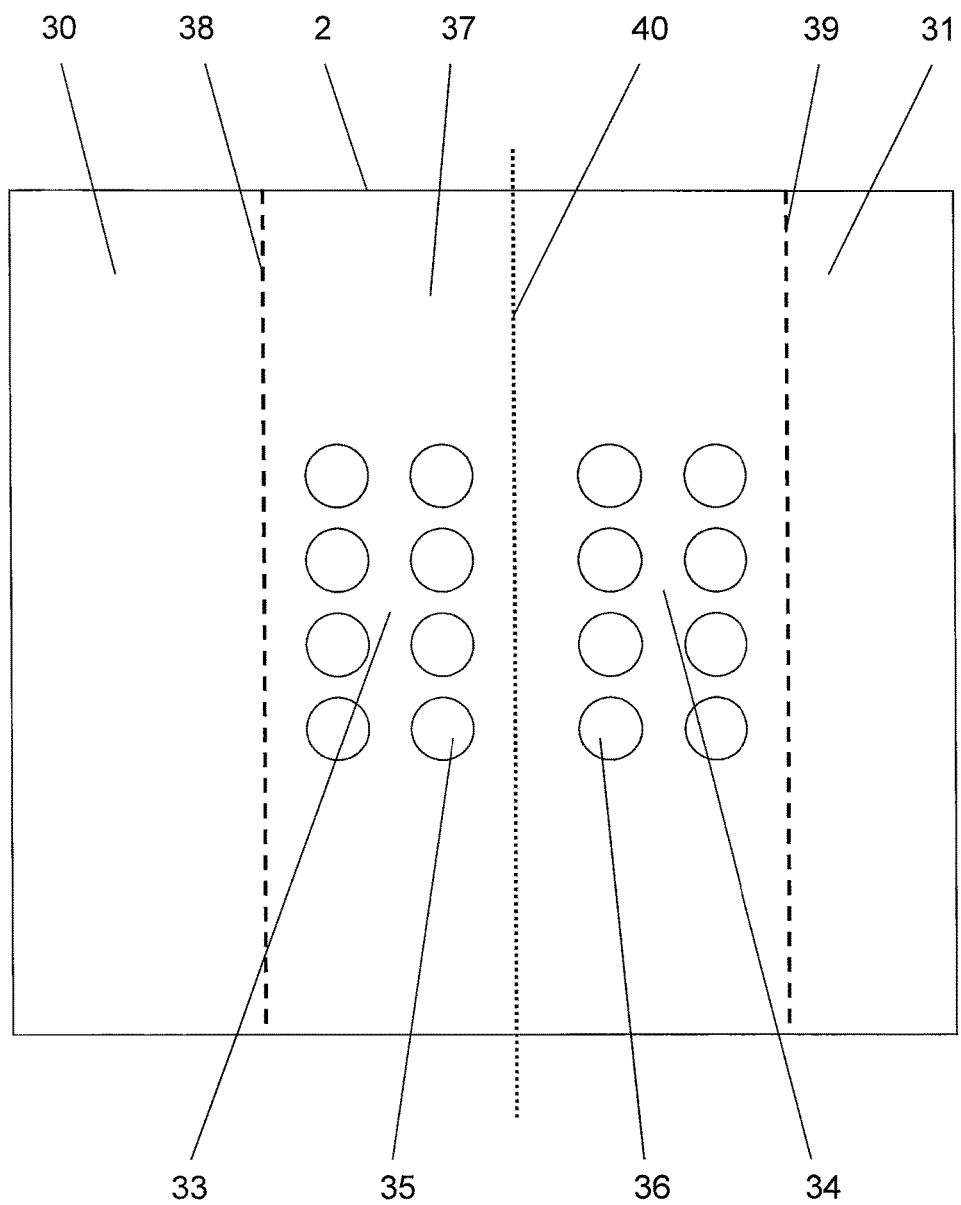
FIG. 2 shows a schematic plan view of a construction zone from FIG. 1 for elucidating the present invention.

The method for calibrating the device for generatively producing the three-dimensional object 8 is described below. For this purpose, FIG. 2 shows a schematic plan view of the construction zone 2 from FIG. 1 with the first scan zone 30, which can be irradiated by the first scanner 14, and the second scan zone 31, which can be irradiated by the second scanner 15. With consideration being given to FIG. 2, the first scanner 14 is assigned to the first scan zone 30, and the second scanner 15 is assigned to the second scan zone 31.

Firstly, a layer of the material 3 applied in the construction zone 2 is scanned by the first scanner 14 in order to produce a first test pattern 33 in the material 3. At the locations of the test pattern, the material is consolidated by the action of the radiation. Alternatively, it is also possible, instead of the applied material 3, to irradiate a specific target (not shown) by means of the first scanner 14 in order to produce a first test pattern in the target. The target can be formed for example from a metal plate or a film or from a material such as photographic paper, for example, which reacts to the radiation of the scanners 14, 15, such that the test pattern remains in the target.

In the next step, the applied layer of the material 3 or the target is irradiated by the second scanner 15 in order to produce a second test pattern 34 in the material 3 or the target.

Preferably, the first and/or the second test pattern 33, 34 are/is a lattice pattern having a specific lattice constant or a point pattern in order to enable a reliable calibration. In the exemplary embodiment illustrated, the first and second test patterns 33, 34 are in each case point patterns consisting of many points 35, 36 arranged in a grid-shaped fashion. Preferably, the first and second test patterns 33, 34 in each case have a partial pattern having an identical shape. However, it is also conceivable for the first test pattern 35 to be completely identical to the second test pattern 36, as in the exemplary embodiment illustrated.

The first and second test patterns 33, 34 are subsequently detected by means of the camera 24. In this case, the first and second test patterns 33, 34 are assigned to the first and second scanners 14, 15, respectively.

In the next step, the first and second test patterns 33, 34 are compared with a reference pattern stored, for example, in the memory device of the control device 7.

It is also possible, of course, for a separately stored reference pattern not to be provided, rather for the first test pattern 33 only to be compared with the second test pattern 34.

In the next step, a first deviation of the first test pattern 33 from the reference pattern and a second deviation of the second test pattern 34 from the reference pattern are determined. If only the first test pattern 33 was compared with the second test pattern 34, a relative deviation between the first test pattern 33 and the second test pattern 34 is determined.

Finally, the first and/or the second scanner 14, 15 are/is calibrated in such a way that the first and/or the second deviation from the reference pattern and/or the relative deviation between the first test pattern 33 and the second test pattern 34 falls below a setpoint value. The calibrating can comprise an offset, a rotation, a scaling or an adaptation of the intensity or focus shape of the electromagnetic radiation 20, 21 from the first and/or the second scanner 14, 15. An appropriate deviation can therefore be, for example, a deviation of the lattice constant of the test patterns 33, 34, a deviation of the position of the test patterns 33, 34 in the coordinate system, a deviation of the orientation of the test patterns 33, 34 in the coordinate system or a deviation of the size of the test patterns 33, 34. Preferably, the calibrating can be carried out by means of an autocorrelation algorithm, a matching method or some other method sufficiently known from the prior art. If the first test pattern 33 was compared with the second test pattern 34, preferably one of the two scanners 14, 15 is fixedly set, while only the other of the two scanners 14, 15 is calibrated in such a way that the relative deviation between the first and second test patterns 33, 34 falls below the setpoint value.

By virtue of the two test patterns being compared with one another, relative errors such as offset or rotation of the test patterns with respect to one another can be identified and corrected, and a relative calibration of the two scanners with respect to one another can be carried out. By virtue of the two test patterns being compared with a stored reference pattern, in addition a deviation of the scaling can be identified and corrected and an absolute calibration of the two scanners can be carried out.

Preferably, the first and second scan zones 30, 31 can mutually overlap in the overlap region 37 in the construction zone 2, as is illustrated in FIG. 2. The reference sign 38 points to a dashed line representing a left boundary of the second scan zone 31, which can be irradiated by the second scanner 15. The reference sign 39 points to a dashed line representing a right boundary of the first scan zone 30, which can be irradiated by the first scanner 14. The reference sign 40 in FIGS. 1 and 2 points to a dotted line representing approximately a central line of the overlap region 37.

The use of the overlap region 37 is advantageous particularly if the production process is intended to be accelerated since the first and second scanners 14, operate simultaneously in the overlap region 37. Preferably, the first and second test patterns 33, 34 are then produced in pairs in the overlap region 37. In the exemplary embodiment illustrated, the first and second test patterns 33, 34 are separated by the central line 40. Good calibration results can be obtained if the first test pattern 33 is situated nearer to the second scanner 15 than the second test pattern 34. Conversely, the second test pattern 34 should then also be situated nearer to the first scanner 14 than the first test pattern 33. In this case, the first scanner 14 would produce the test pattern 34 in FIG. 2, and the second scanner 15 would produce the test pattern 33 in FIG. 2.

The method according to the invention can be carried out in particular "in situ" during the production of the three-dimensional object 8. In this way, possible deviations of the scanners 14, 15 can be eliminated in real time during the construction process. Moreover, the test patterns 33, 34 can also be part of the real object 8. Alternatively, the method according to the invention can also be carried out during the heating phase of the device or at the end of the production process as final monitoring.

It is advantageously possible, by means of the calibration of the scanners 14, 15, to produce dimensionally accurately even large objects 8 in a correspondingly large construction zone 2.

In the exemplary embodiment illustrated, the construction zone 2 is divided into two scan zones 30, 31, which are in each case irradiated by an assigned scanner 14, 15. In one development, the construction zone 2 can be divided into four identical scan zones, which are in each case irradiated by an assigned scanner. In principle, any desired plurality of scanners and scan zones assigned thereto which cover a construction zone are possible.

Instead of two or more separate radiation sources 10, 11 for the plurality of scanners 14, 15, provision can also be made of only one radiation source, from which the two or more focused or directional beams 12, 13 are generated by means of one or more beam splitters.

The invention has been described for a laser sintering device in which a laser 11 was used as radiation source. However, any other radiation source is also conceivable which can be used to introduce electromagnetic or particle radiation into the pulverulent structural material. In this regard, by way of example, a radiation source for incoherent light radiation, for IR radiation, for X-ray radiation or for electron radiation can be used as radiation source. Correspondingly, a pulverulent structural material which can be consolidated by means of the respective radiation should be used. Accordingly, the invention is applicable not just to laser sintering but to all powder-based, generative methods in which use is made of a material or a powder material which is consolidated by the energy beam. In this case, the method according to the invention is suitable particularly for plastic powder since the requirements with regard to the camera resolution are less stringent than in the case of metal powder, for example. The device for producing a three-dimensional object can also be a laser fusion device or a device with mask exposure.

The scope of protection is not restricted to the exemplary embodiments illustrated, rather it encompasses further changes and modifications, provided that they lie within the scope defined by the appended claims.

The invention claimed is:

1. A method for automatically calibrating an apparatus for generatively producing a three-dimensional object, comprising:
   providing a construction zone, in which the object is to be constructed layer by layer by selective consolidation of a pulverulent material;
   providing a control unit for controlling the apparatus,
   providing an irradiation device for emitting electromagnetic radiation onto selective regions of an applied layer of the material, wherein the irradiation device comprises at least one first and at least one second scanner;
   operating the irradiation device with the first scanner, irradiating a first scan zone in the construction zone, and the second scanner irradiating a second scan zone in the construction zone; and
   irradiating the applied layer of the material or a target by means of the first scanner in order to produce a first test pattern in the material or the target;
   irradiating the applied layer of the material or the target by means of the second scanner in order to produce a second test pattern in the material or the target;
   detecting the first and second test patterns by means of a camera and assigning the first and second test patterns to the first and second scanners, respectively;
   comparing the first and second test patterns with one another;
   determining a relative deviation between the first test pattern and the second test pattern comprising at least a deviation of a lattice constant of the test patterns, a deviation of a position of the test patterns in a coordinate system, a deviation of an orientation of the test patterns in the coordinate system or a deviation of size of the test patterns; and
   calibrating the first and/or the second scanner in such a way that the relative deviation between the first test pattern and the second test pattern falls below a predetermined setpoint value.

2. The method as claimed in claim 1, wherein the first and second scan zones mutually overlap in an overlap region in the construction zone.

3. The method as claimed in claim 2, wherein the first and second test patterns are produced in pairs in the overlap region.

4. The method as claimed in claim 2, wherein the first test pattern is situated nearer to the second scanner than the second test pattern.

5. The method as claimed in claim 1, wherein the first and/or the second test pattern are/is a lattice pattern or a point pattern.

6. The method as claimed in claim 1, wherein the first and second test patterns in each case have a partial pattern having an identical shape.

7. The method as claimed in claim 1, wherein the calibrating comprises an offset, a rotation, a scaling or an adaptation of the intensity or of the focus shape of the electromagnetic radiation on the first and/or the second scanner.

8. The method as claimed in claim 1, wherein the calibrating is carried out by means of an autocorrelation algorithm or a matching method.

9. The method as claimed in claim 1, wherein the calibrating is carried out during the production of the three-dimensional object.

10. The method as claimed in claim 1, wherein the pulverulent material is a metal powder.

11. The method as claimed in claim 1, wherein the pulverulent material is a plastic powder.

* * * * *